United States Patent
Natarajan et al.

(10) Patent No.: US 11,853,388 B1
(45) Date of Patent: Dec. 26, 2023

(54) RECALIBRATION FREQUENCY DETERMINATION FOR STATE SPACE MODELS

(71) Applicant: Amazon Technologies, Inc., Seattle, WA (US)

(72) Inventors: Ramesh Natarajan, Pleasantville, NY (US); Kamalakannan Elangovan, Jersey City, NJ (US); Sravan Kumar Kasturi, Snohomish, WA (US); James Kingsbery, Westfield, NJ (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 823 days.

(21) Appl. No.: 16/562,168

(22) Filed: Sep. 5, 2019

(51) Int. Cl.
*G06F 17/18* (2006.01)
*G06F 17/15* (2006.01)

(52) U.S. Cl.
CPC ............ *G06F 17/18* (2013.01); *G06F 17/156* (2013.01)

(58) Field of Classification Search
CPC .............................. G06F 17/18; G06F 17/156
See application file for complete search history.

(56) References Cited

U.S. PATENT DOCUMENTS

| | | | |
|---|---|---|---|
| 2009/0234710 A1* | 9/2009 | Belgaied Hassine | G06Q 30/0201 705/7.29 |
| 2010/0325487 A1* | 12/2010 | Minhas | G06F 11/2257 714/26 |
| 2011/0119209 A1* | 5/2011 | Kirshenbaum | G06N 5/02 706/12 |
| 2014/0344193 A1* | 11/2014 | Bilenko | G06N 20/00 706/12 |
| 2018/0285772 A1* | 10/2018 | Gopalan | G06N 20/00 |
| 2020/0380378 A1* | 12/2020 | Moharrer | G06N 20/20 |

OTHER PUBLICATIONS

Sebastian Raschka, "Model Evaluation, Model Selection, and Algorithm Model Evaluation, Model Selection, and Algorithm," 2018, Arxiv, 49 pages (Year: 2018).*

Glaura C. Franco et al., "Confidence intervals for the hyperparameters in structural models," 2006, ftp://est.ufmg.br/pub/fcruz/pub/cis-sbm. pdf, 16 pages (Year: 2006).*

(Continued)

*Primary Examiner* — Eunhee Kim
(74) *Attorney, Agent, or Firm* — K&L Gates LLP (57) ABSTRACT

Devices and techniques are generally described for determining a recalibration frequency of a state space model. In various examples, a first hyperparameter for a first dataset may be determined. A residual value between a first data point of the first dataset and a machine learning model fitted to the first dataset may be determined. A plurality of second datasets may be generated based on the residual value. Second hyperparameters may be determined for the plurality of second datasets. A variability of the second hyperparameters may be determined. A third hyperparameter may be determined for a subset of the first dataset. A recalibration frequency may be determined for the machine learning model by comparing the third hyperparameter to the variability of the second hyperparameters.

23 Claims, 5 Drawing Sheets

(56) References Cited

OTHER PUBLICATIONS

Glaura Franco et al., "A comparison of methods for bootstrapping in the local level model," 2002, Journal of Forecasting vol. 21, pp. 27-38 (Year: 2002).*

David S. Stoffer et al., "Resampling in state space models," 2004, in A. Harvey et al., "State Space and Unobserved Component Models: Theory and Applications," Cambridge University Press, 27 pages (Year: 2004).*

Danny Pfeffermann et al., "Bootstrap Approximation to Prediction MSE for State-Space Models with Estimated Parameters," 2004, S3RI Methodology Working Papers M03/05, Southampton Statistical Sciences Research Institute, 32 pages (Year: 2004).*

Yingyuan Yang et al., "Retraining and dynamic privilege for implicit authentication systems," 2015, IEEE 12th International Conference on Mobile Ad Hoc and Sensor Systems, pp. 163-171 (Year: 2015).*

Kurt Thomas et al., "Design and evaluation of a real-time url spam filtering service," 2011, 2011 IEEE Symposium on Security and Privacy, 16 pages (Year: 2011).*

Castrup, H., "Calibration Intervals from Variables Data," 2006, NCSLI 2005 Workshop & Symposium, 12 pages (Year: 2006).*

Stephen M. Mayo et al., "Optimization with uncertainty—a case study for controller recalibration," 2020, Computers and Chemical Engineering, vol. 139, 4 pages (Year: 2020).*

Jeff Rasley et al., "HyperDrive: Exploring Hyperparameters with POP Scheduling," 2017, Middleware '17: Proceedings of the 18th ACM/IFIP/USENIX Middleware Conference, pp. 1-13 (Year: 2017).*

\* cited by examiner

RECALIBRATION FREQUENCY DETERMINATION FOR STATE SPACE MODELS

BACKGROUND

State space models can be used to analyze dynamic phenomena and evolving systems. State space models describe a probabilistic dependence between a state variable and the observed measurement. In various examples, machine learning algorithms can be used to generate state space models for a given set of observational data. Machine learning models are often trained on data that is acquired continuously, but that is batched for model training and calibration. Hyperparameters are settings of a machine learning model that can be tuned to control the behavior of the machine learning algorithm. Hyperparameters are often distinguishable from machine learning model parameters that can be "learned" during training of the machine learning model. For example, hyperparameters of a machine learning model may often be set before the learning process begins. Examples of such hyperparameters include the learning rate for training a neural network, the σ hyperparameter for a support vector machine, and the k value in k-nearest neighbors (KNN).

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Machine learning techniques may be used to generate state space models that describe the probabilistic dependence between the latent state variable and the observed measurements. State space models may provide a general framework for analyzing deterministic and stochastic dynamic systems with observable measurements. State space models may be used in engineering, statistics, computer science, and/or economics to solve a wide range of dynamical system problems and/or to make predictions and/or forecast events.

Machine learning models may be trained on data that is acquired continuously, but that is batched for purposes of model training and/or calibration. In various examples, due to computer storage limitations (e.g., storage size, availability, and/or cost), only a fixed window of historical data may be retained for use as a training/re-training set. For example, a fixed window of historical data that is at or close to a minimum amount of data sufficient to train and/or calibrate the machine learning model may be stored. For example, if a period of a single year's worth of data is the fixed window of historical data to be retained, the newest incoming data may be used to replace the oldest data stored in storage. The oldest data may be overwritten and/or otherwise replaced in non-transitory computer-readable memory (e.g., storage).

Generally, in machine learning models such as neural networks, parameters control activations in neurons (or nodes) within layers of the machine learned models. In neural networks, the weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data (such as the fixed windows of historical data described above) may be used to generate a cost or "loss" function that describes the difference between expected output of the machine learning model and actual output. Various different loss functions may be used depending on the particular machine learning algorithm (e.g., negative log-likelihood, mean squared prediction error, etc.). The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

Furthermore, calibration may be performed on the historical data in order to determine the unknown values of one or more model hyperparameters. Calibration may comprise determining hyperparameter values that minimize a loss function that compares model predictions to observational values over the training batch.

In an example, a state space model may be determined based on a fixed window of historical data comprising the past 4 years of observational data (e.g., for an economic forecasting model). Such fixed windows of historical data may be used in round robin databases, due to storage limitations, or due to the discarding of older historical data that has limited value for predicting current trends, etc. Hyperparameters may be determined for a weekly model using the calibration described above based on the 4 years of observational data. However, as more time passes and as the dataset changes due to the oldest data being overwritten to accommodate the newest data, the hyperparameters may no longer be optimized for the newer data. This phenomenon may be described as "hyperparameter drift" and may result in suboptimal model performance.

However, continually recalibrating the machine learning model to avoid the consequences of hyperparameter drift may be expensive (in terms of use of computing resources, down-time for the model, and/or power consumption). Additionally, depending on the characteristics of the changing data set, the calibrated hyperparameters may not be significantly different from their previous values, resulting in wasted computational effort and/or increased model prediction latency, without corresponding improvements in prediction accuracy. Additionally, frequent model recalibration may result in needless downtime (e.g., when model hyperparameters have not drifted by an amount that significantly affects model performance). Accordingly, described herein are techniques for estimating a recalibration frequency for state space models that are widely used in time series forecasting.

Figure 1:
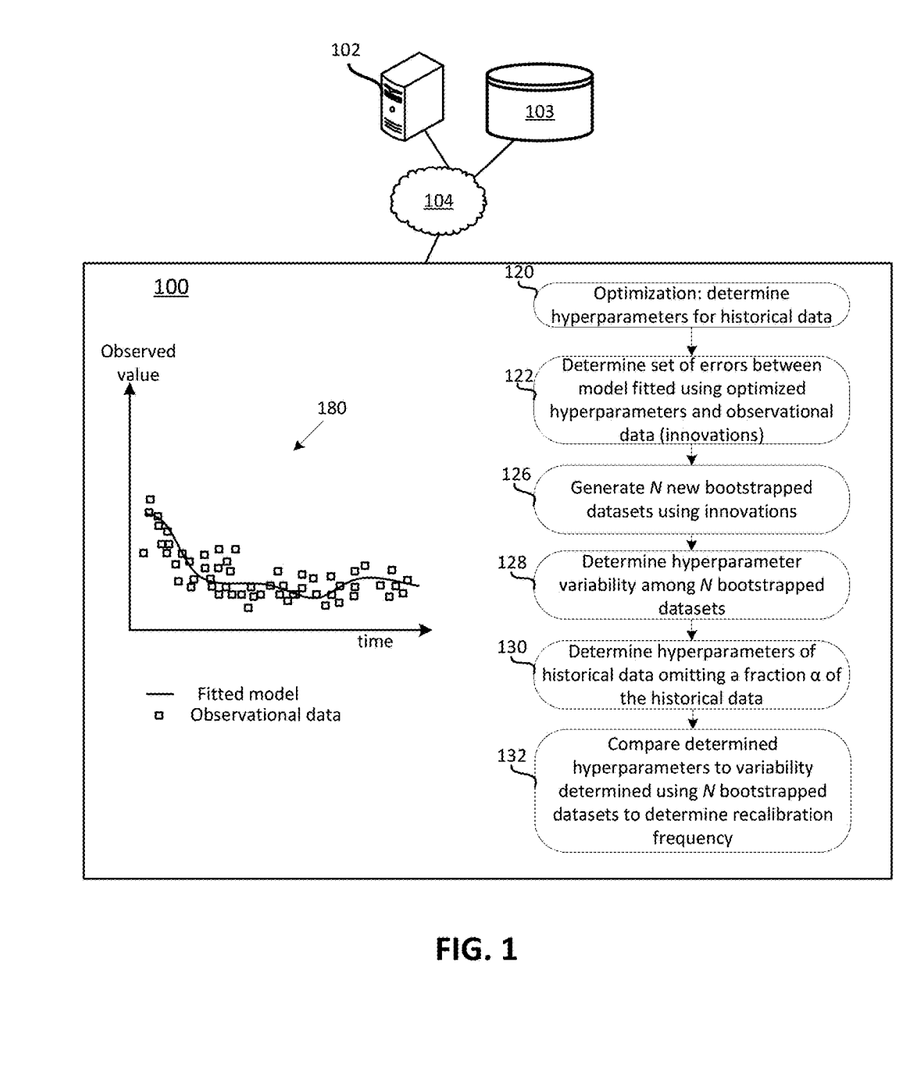
FIG. 1 is a diagram illustrating an example system and process for determining a recalibration frequency for state space models, according to various embodiments of the present disclosure.

FIG. 1 is a diagram illustrating an example recalibration frequency determination system 100. The recalibration frequency determination system 100 may be implemented by one or more computing device(s) 102. In various examples, one or more non-transitory computer-readable memories 103 may be configured in communication with the computing device(s) 102. The one or more memories 103 may store computer-executable instructions that, when executed by one or more processors of computing device(s) 102 may be effective to program the one or more processors to perform the various techniques described herein. In various examples, network 104 may be a wide area network, such as the internet, or may be a local area network (LAN) over which computing device(s) 102 and/or memories 103 communicate.

In various examples, if the variability in the hyperparameter values of a fitted state space model can be determined (e.g., the standard error for the hyperparameters), hyperparameter drift can be determined by comparing current hyperparameters to the hyperparameter variability of the model. However, calculation of the standard errors of the hyperparameters of a fitted model during optimization (e.g., by directly calculating the Hessian, and/or approximating the Hessian during the optimization) may not be feasible due to inaccuracies in the finite-difference approximations to the Hessian, and/or because the optimal solution is located on the boundary of the feasible region. Accordingly, various techniques are described herein to generate new datasets using innovations (e.g., discrepancies between values of a fitted state space model and historical observational data points), and using a "boot-strapping" technique to generate N additional datasets. Innovations are sometimes referred to as residuals (or residual values), in statistics and machine learning contexts. Hyperparameter variability among the N additional datasets (e.g., N bootstrapped datasets) may be determined. The various techniques introduced above are described in further detail below. Additionally, after determining the hyperparameter variability among the N bootstrapped datasets, various techniques are described below for estimating a recalibration frequency for the state space model by randomly omitting portions of the historical data and recalculating the hyperparameters for the partial historical data to determine if the hyperparameters fall outside the variability calculated using the N bootstrapped datasets. Although N bootstrapped datasets may be used to determine hyperparameter variability in accordance with various embodiments, it is noted that hyperparameter variability may be estimated and/or determined using other techniques in order to determine the recalibration frequency of a state space model based on historical data. For example, as described above, the Hessian may be calculated and/or may be approximated during optimization and used to provide an alternative embodiment for estimating the hyperparameter variability.

FIG. 1 depicts a graphical illustration of historical data 180 over a given time period. In FIG. 1, squares may represent observational data, while the continuous line may represent a state space model fitted to the observational data. As previously described, a fixed window of historical data may be retained, although data may be continually collected over time. In various examples, the size of the fixed window of stored data (e.g., stored in memories 103) may be large enough to collect data sufficient for model training (e.g., for capturing long-term and/or seasonal trends in the data), but not so large that the storage costs are prohibitive.

In various examples, computing device(s) 102 may be effective to determine hyperparameters for the historical data 180 (e.g., for the fixed window of historical data currently stored in memory 103). In various examples, computing device(s) 102 may perform an optimization action 120 to determine the hyperparameters through model calibration. Model calibration may include minimizing a loss function that compares model predictions (e.g., predicted output of the model) to observational values over the training batch (e.g., the observational data). In various examples, the particular loss function used may depend on the machine learning algorithm being employed.

In various examples, computing device(s) 102 may be effective to perform action 122. Action 122 may include determining "innovations" for the current model. Innovations may be the set of errors (discrepancies) between the model predictions fitted using the optimized hyperparameters (e.g., the fitted model continuous line from historical data 180) and the observational data (e.g., the squares from historical data 180).

In various examples, computing device(s) 102 may use the set of errors determined at action 122 to generate N new bootstrapped datasets using the bootstrapping techniques described below. The bootstrapping techniques described below were introduced in David S. Stoffer and Kent D. Wall, Bootstrapping State-Space Models: Gaussian Maximum Likelihood Estimation and the Kalman Filter. *Journal of the American Statistical Association*, 86(416): 1024-1033, 1991.

In various examples, other bootstrapping techniques apart from what is explicitly described below may be used to determine hyperparameter variability for a state space model based on historical data. For example, in various examples, the terms Gx(t) and/or Dx(t) may be omitted from the various equations below (e.g. when there are no exogenous variables in the model, as is often the case). In at least some other examples, hyperparameter variability may be determined and/or estimated for a state space model without using bootstrapping. For example, the Hessian may be directly calculated for a state space model that has been trained on historical data. In another example, the Hessian may be indirectly estimated as a by-product of the optimization method for training the state space model. In both these cases, the magnitude of the calculated Hessian provides an alternative estimation procedure for the hyperparameter variability.

In the various examples described below, the state space model may be defined by the equations:

$$s(t+1) = Fs(t) + Gx(t) + w(t) \tag{1}$$

and $$y(t) = Hs(t) + Dx(t) + v(t) \tag{2}$$

where s(t) is a p×1 vector of unobserved state variables, y(t) is a q×1 vector of observed outputs or endogenous variables, and x(t) is an r×1 vector of observed inputs or exogenous variables. The constant matrices F, G, H, and D represent the model coefficients of dimensions compatible with the matrix operations used in equations (1) and (2). The two terms w(t) and v(t) may represent zero-mean random processes that are each independent and identically distributed with $$E\{w(t)w'(t)\}=Q,\ E\{v(t)v'(t)\}=R,\ E\{w(t)v'(t)\}=0, \quad (3)$$

where Q is a p×p nonnegative definite matrix and R is a q×a nonnegative definite matrix.

The model coefficients and the correlation structure may be uniquely parameterized by a k×1 vector $\theta$; that is, $F=F(\theta)$, $G=G(\theta)$, $H=H(\theta)$, $D=D(\theta)$, $Q=Q(\theta)$, and $R=R(\theta)$. The vector $\theta$ is assumed to be an element of some compact space $\mathscr{P}$, (such as a subset of $\mathscr{R}$ k).

s(t+1|t) may denote the best linear predictor of s(t+1) based on the data $\mathscr{Y}=\{y(1),\ldots y(t)\}$ and $X^t=\{x(1),\ldots x(t)\}$, obtained via the Kalman filter. Also obtained from the Kalman filter are the innovations, the innovations covariance matrix, and the Kalman gain matrix (respectively, equations (4), (5), and (6)):

$$\in(t)=y(t)-Hs(t|t-1)-Dx(t) \quad (4),$$

$$\Sigma(t)=HP(t|t-1)H'+R \quad (5)$$

and $$K(t)=P(t|t-1)H'\Sigma(t)^{-1} \quad (6)$$

where P(t|t−1) is the covariance matrix of s(t)−s(t|t−1). The model innovations from the Kalman filter give rise to the innovations form representation of the observations:

$$s(t+1|t)=Fs(t|t-1)+Gx(t)+FK(t)\in(t) \quad (7)$$

and $$y(t)=Hs(t|t-1)+Dx(t)+\in(t) \quad (8)$$

Parameter estimation may be accomplished via Gaussian maximum likelihood (GML). The useful part of the logarithm of the Gaussian likelihood function may be $$L(\theta|\mathcal{Y}^T,\mathcal{X}^T)=\sum_{t=1}^{T}\left\{\log\left|\sum(t,\theta)\right|+\epsilon(t,\theta)'\sum^{-1}(t,\theta)\epsilon(t,\theta)\right\}, \quad (9)$$

where and $\Sigma$ are $\in$ generated from equations (4) and (5) and |•|denotes the determinant. Maximizing equation (9) with respect to $\theta$ yields the Gaussian maximum likelihood estimate $\hat{\theta}=\max_\theta L(\theta|\mathcal{Y}^T,X^T)$. Iterative procedures for maximizing this function exist in many forms.

The bootstrap procedure of action 126 for state space models may be defined by a four-step algorithm. In various examples, a Kalman filter may have been run with $\theta=\hat{\theta}$ so that the estimated innovations, $\in(t,\hat{\theta})$, are available.

1. Construct the standardized innovations (e.g., a standardized set of residual values) by setting $$e(t,\hat{\theta})=\Sigma^{-1/2}(t,\theta)\in(t,\hat{\theta}), \quad (10)$$

where $\Sigma^{-1/2}$ (t, $\theta$) is the inverse of the unique square-root matrix of $\Sigma$(t, $\theta$). By using equation (10) all model residuals may have at least the same two first moments.

2. Sample, with replacement, T times from {e(t,$\hat{\theta}$); 1≤t≤T} to obtain {e*(t, $\hat{\theta}$); 1≤t≤T}, a bootstrap sample of standardized innovations.

3. Using the innovations form representation (equations (7) and (8)) construct a bootstrap data set {y*(t); 1≤t≤T} as follows: Define the (p+q)×1 vector $\zeta(t)=[s'(t+1|t)|y'(t)]'$. Stacking equations (7) and (8) may result in a vector first-order equation in $\zeta(t)$, $$\zeta(t)=A\zeta(t-1)+Bx(t)+C(t)e(t,\theta), \quad (11)$$

where $$A=\begin{bmatrix}F & 0\\ H & 0\end{bmatrix}, B=\begin{bmatrix}G\\ D\end{bmatrix}, C(t)=\begin{bmatrix}FK(t)\sum^{1/2}(t,\theta)\\ \sum^{1/2}(t,\theta)\end{bmatrix}$$

Thus, to construct a bootstrap data set, {y*(t); 1≤t≤T}, solve equation (11) using {e*(t,$\hat{\theta}$); 1≤t≤T} in place of {e*(t,$\theta$); 1≤t≤T}. The exogenous variables, {x(t); 1≤t≤T}, and the initial conditions of the Kalman filter remain fixed at their given values while the parameter vector $\theta$ is held fixed at $\hat{\theta}$.

4. Repeat steps (2) and (3) a large number, N, of times, obtaining a set of N new bootstrapped datasets, {$\hat{\theta}^{*i}$; 1≤i≤N}. The distribution of $\hat{\theta}$ may be estimated from the distribution of the $\hat{\theta}^{*i}$.

After generating N bootstrapped datasets from the innovations determined at action 122 using the procedure described above, the hyperparameters may be determined for each of the N bootstrapped datasets using the same procedure as described above in reference to action 120. Thereafter, the hyperparameter variability may be determined at action 128 using the mean hyperparameter value, the variance, and/or standard deviation among the hyperparameter values of the N bootstrapped datasets. In various examples, the variance of the N bootstrapped datasets may be considered an estimate of the standard error of the hyperparameters of the fitted model calibrated using historical data 180. The bootstrap procedure described above may be used to simulate the intrinsic probabilistic variability of the observational data. Although the underlying distribution of the observational may not be known, it can be simulated by approximating the unknown probability distribution using the empirical distribution of the calculated residuals/innovations (which are assumed to be independent and identically distributed (IID)), and then sampling with replacement from this empirical distribution.

At action 130, new subsets of the historical data 180 may be generated by omitting a fraction $\alpha$ of the historical data to generate a new dataset Z. In various examples, the fraction $\alpha$ may be randomly selected from observational data points throughout the time series data of the historical data 180. For example, if the historical data 180 represents a series of financial transactions for a business over a 4 year window, the fraction $\alpha$ may initially be set at 5% (or some other value, depending on the desired implementation). If the fraction $\alpha$ is set at 5%, 5% of the data, selected randomly/pseudo-randomly may be omitted from the historical data 180. In various examples, due to the correlation between data in a time series, it may be advantageous to randomly select non-consecutive data for omission when omitting the fraction $\alpha$. For example, if there are approximately 208 weeks in a 4 year period of historical data, and the fraction $\alpha$ to be omitted is 5%, ~10 different weeks of data may be selected at random for omission. Since the weeks are selected at random, it is highly likely that the 10 weeks selected will represent a non-consecutive time period. This may be useful, as otherwise, a consecutive period of missing observations may inadvertently remove significant time periods in the time series data (e.g., data during a peak holiday season in the financial transaction example provided above) and/or due to interdependence of the time series historical data. Accordingly, at action 130, a subset of the historical data 180 may be generated by randomly omitting a fraction α of the historical data to generate a new dataset Z. The hyperparameters of the new dataset Z may be determined according to the procedure described above with respect to action 120. In at least some examples, the hyperparameters of the new dataset Z may be averaged over a number of simulations, in order to obtain stable and representative values.

Thereafter, at action 132, the hyperparameters of the new dataset Z may be compared to the variability determined for those respective hyperparameters (from action 128). The variability, in some examples, may be expressed as a tolerance from a mean value for a hyperparameter. For example, a mean value of a hyperparameter $\theta_1 +/-$ a variability for $\theta_1$ (e.g., 1 standard deviation, etc.). If the hyperparameters of the new dataset Z are outside the variability range, hyperparameter drift may have occurred over the time period represented by the fraction α. Conversely, if the hyperparameters of the new dataset Z are within the variability range, hyperparameter drift may not have occurred over the time period represented by the fraction α. In various examples, a recalibration frequency for the hyperparameters of the model may be estimated by incrementally (or otherwise) increasing the fraction α until the first occurrence of the hyperparameters of the new dataset Z falling outside the variability range.

Figure 2:
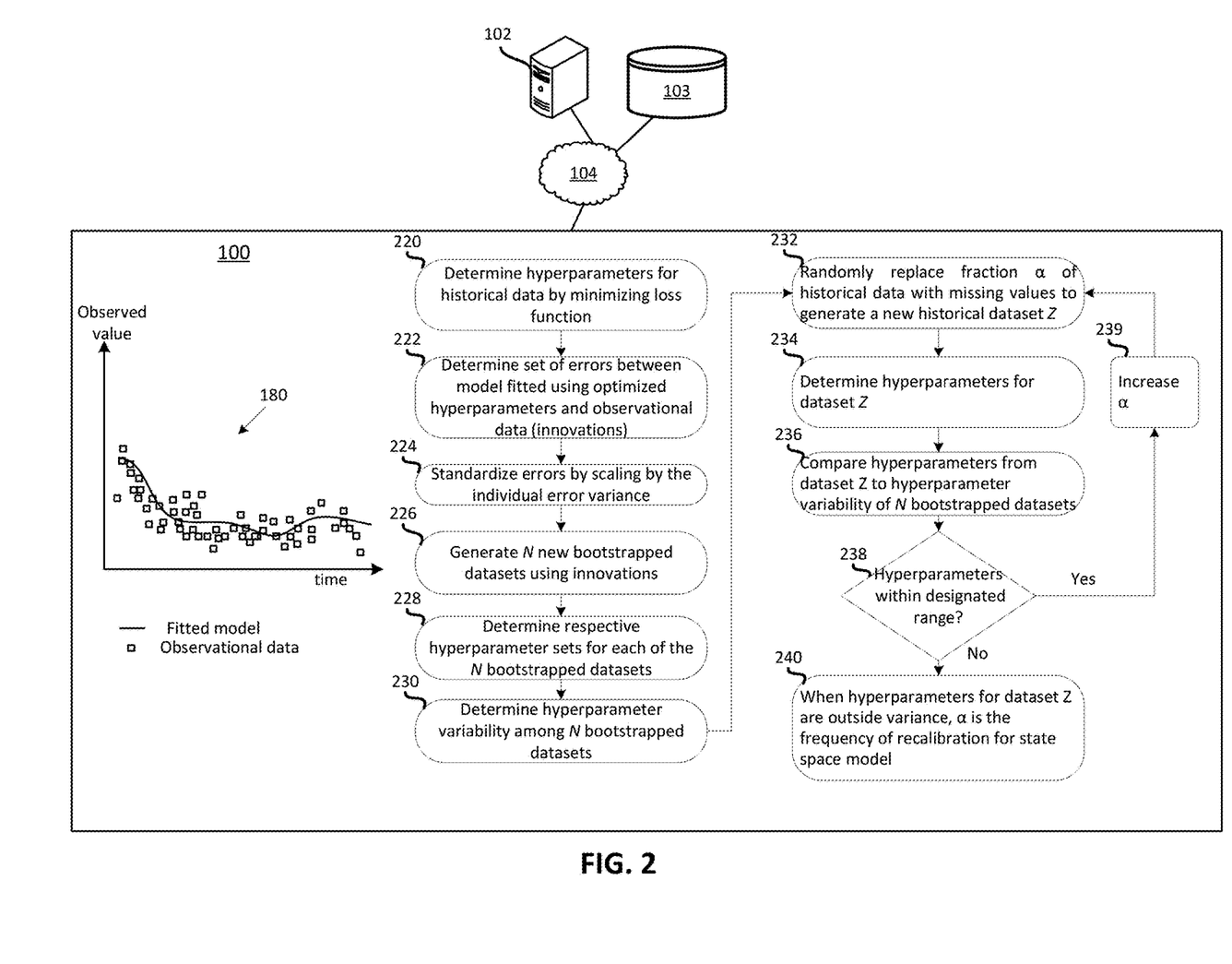
FIG. 2 is diagram illustrating an example process for determining a recalibration frequency for state space models, including additional details, in accordance with various embodiments of the present disclosure.

FIG. 2 is diagram illustrating an example process for determining a recalibration frequency for state space models, including additional details, in accordance with various embodiments of the present disclosure.

In various examples, computing device(s) 102 may be effective to determine hyperparameters for the historical data 180 (e.g., for the fixed window of historical data currently stored in memory 103). In various examples, computing device(s) 102 may perform an optimization action 220 to determine the hyperparameters through model calibration. Model calibration may include minimizing a loss function that compares model predictions (e.g., predicted output of the model) to observational values over the training batch (e.g., the observational data). In various examples, the particular loss function used may depend on the machine learning algorithm being employed.

In various examples, computing device(s) 102 may be effective to perform action 222. Action 222 may include determining a set of errors between the model fitted using the optimized hyperparameters (e.g., the state space model represented by the solid line) and the observational data. As previously described, the set of errors may be referred to as "innovations." Innovations are discrepancies between the model predictions fitted using the optimized hyperparameters (e.g., the fitted model continuous line from historical data 180) and the observational data (e.g., the squares from historical data 180).

In some examples, at action 224, the set of errors determined at action 222 may be standardized by scaling the individual error variance to generate a set of errors that is independent (assuming the state space model is reasonable) and identically distributed. Equation (10) above may be used to generate a set of standardized innovations. $\in(t, \hat{\theta})$ is the time series of errors or innovations. Scaling may be performed using the matrix $\Sigma^{-1/2}(t, \hat{\theta})$. $e(t, \hat{\theta})$ is the set of standardized innovations which are IID (Equation (10), above). The resampling procedure may be carried out with $e(t, \hat{\theta})$ to generate a new "simulated" observational data set since, by definition, the values of an IID sequence are exchangeable.

In various examples, at action 226, computing device(s) 102 may use the set of errors determined at action 222 (as scaled at action 224) to generate N new bootstrapped datasets using the bootstrapping techniques described above. In various examples, the innovations determined at action 222 (as scaled using action 224) may be sampled with replacement to generate a new set of innovations. Each sampled set of innovations may be used to generate one of the N bootstrapped datasets using the procedure described above. After generating N bootstrapped datasets, the hyperparameters may be determined for each of the N bootstrapped datasets at action 228. The hyperparameters may be determined using the same procedure as described above in reference to action 220. Thereafter, the hyperparameter variability may be determined at action 230 using the mean, variance, and/or standard deviation among the hyperparameters of the N bootstrapped datasets. In various examples, the variance of the Nbootstrapped datasets may be considered an estimate of the standard error of the hyperparameters of the fitted model calibrated using historical data 180.

At action 232, new subsets of the historical data 180 may be generated by omitting a fraction α of the historical data to generate a new historical dataset Z. In various examples, the fraction α may be randomly selected from observational data points throughout the time series data of the historical data 180. For example, if the historical data 180 represents a series of financial transactions for a business over a 4 year window, the fraction α may initially be set at 5% (or some other value, depending on the desired implementation). If the fraction α is set at 5%, 5% of the data, selected randomly/pseudo-randomly may be omitted from the historical data 180. In various examples, due to the correlation between data in a time series, it may be advantageous to randomly select non-consecutive data for omission when omitting the fraction α. For example, if there are approximately 208 weeks in a 4 year period of historical data, and the fraction α to be omitted is 5%, ~10 different, weeks of data may be selected at random for omission. Since the weeks are selected at random, it is highly likely that at least some of the 10 weeks selected will be non-consecutive with respect to one another. This may be useful due to significant time periods in the time series data (e.g., a holiday season in the financial transaction example provided above) and/or due to interdependence of the time series historical data. Accordingly, at action 232, a subset of the historical data 180 may be generated by randomly omitting a fraction α of the historical data to generate a new historical dataset Z. At action 234, hyperparameter values of the new dataset Z may be determined according to the procedure described above with respect to action 220. In at least some examples, the hyperparameter values of the new dataset Z may be averaged over a number of simulations, in order to obtain stable and representative values.

At action 236 the hyperparameters of the new dataset Z may be compared to the variability determined for those respective hyperparameters (from action 228). The variability, in some examples, may be expressed as a tolerance from a mean value for a hyperparameter. For example, a mean value of a hyperparameter $\theta_1 +/-$ a variability for $\theta_1$ (e.g., 1 standard deviation, etc.). At action 238, it may be determined whether the hyperparameters of the new dataset Z are within the variability range determined at action 230. The variability range may be a designated range (e.g., an acceptable range of hyperparameter values) determined, for example, using the mean and standard deviation of hyperparameter values determined for the N bootstrapped datasets. For example, a designated hyperparameter range may be +/−σ, +/−2σ, etc. If, at action 238, the hyperparameters of the new dataset Z are within the variability range determined at action 230, processing may proceed to action 239, and the fraction α may be increased by a desired amount. Any amount of increase may be used according to the desired implementation and according to the characteristics of the particular dataset. Processing may proceed from action 239 to action 232 and another new historical dataset Z may be generated by randomly omitting the newly-increased fraction α of the historical dataset 180.

If, at action 238, the hyperparameters of the new dataset Z are outside the variability range determined at action 230, the time period represented by the fraction α may represent the estimated recalibration frequency for the state space model (action 240). Accordingly, the foregoing process may be recursively used to determine a recalibration frequency for a state space model. In various examples, the fraction α may be increased until the hyperparameters determined for the resultant new historical dataset Z fall outside the hyperparameter variability range determined for the N bootstrapped datasets. Once the hyperparameters determined for the resultant new historical dataset Z fall outside the hyperparameter variability range determined for the N bootstrapped datasets, the fraction α (expressed as a time period) may represent the estimated recalibration frequency that may avoid unwanted hyperparameter drift for the state space model.

For example, initially the fraction α may be 5% of the historical data, which may be equivalent to 2 weeks worth of data. After omitting the 2 weeks randomly from the historical data 180, the hyperparameters of the resultant dataset Z may still be within the hyperparameter variability determined for the N bootstrapped datasets (e.g., representative of the standard error of hyperparameter variability within the original model). Accordingly, the fraction α may be increased to 10% (or 6% or any suitable value). The process may be repeated until the hyperparameters of the resultant dataset Z fall outside the hyperparameter variability determined for the N bootstrapped datasets. At that point, the fraction α may represent the estimate of the recalibration frequency.

Estimating the recalibration frequency may allow for minimum model downtime and may minimize storage requirements of historical data. Various other benefits may result from estimating the recalibration frequency in accordance with the various techniques described herein. For example, although new observational data may be collected, the model hyperparameters need not be recalibrated repeatedly unless the sequence of new observational data has been determined to have resulted in hyperparameter drift. Note that the recalibration step may be computationally expensive and may require retrieval of all available historical data. However, if there is no significant hyperparameter drift, then the model hyperparameters can be frozen at their current values until the next recalibration event and the "frozen" model may be used for making model prediction. Such a process may have minimal computational requirements and may only require the new observational data rather than the entire available historical sequence.

For context, the computational cost of model calibration for the state space model given in equations (1) and (2) above, for the case of a univariate time series (q=1) is of the order $KT p^3$, where K is the number of steps required to achieve convergence in the optimization procedure for the maximum likelihood computation, T is the length of the time series (the number of observations), and the state update for a new observation is $p^3$. In an example, K=10, T=200, so the computational savings from avoiding recalibration is quite large (as long as model prediction accuracy is not affected due to hyperparameter drift).

In various examples, after determining a recalibration frequency using the techniques described above, observational data may be collected and stored on a continuous or predefined basis. However, in at least some examples, the oldest data in a time series may be overwritten with the newest observational data (such as in a "round robin" style database). In various examples, computing device(s) 102 may determine whether or not an elapsed amount of time since the last hyperparameter calibration has exceeded a time period defined by the recalibration frequency (as determined by the techniques described above). If the elapsed time period is less than the time period associated with the recalibration frequency, computing device(s) 102 may continue to store observational data (e.g., by overwriting the oldest stored data). However, if the elapsed time period is greater than or equal to the time period associated with the recalibration frequency, hyperparameter recalibration may be performed using the currently-stored dataset (e.g., according to action 220).

Figure 3:
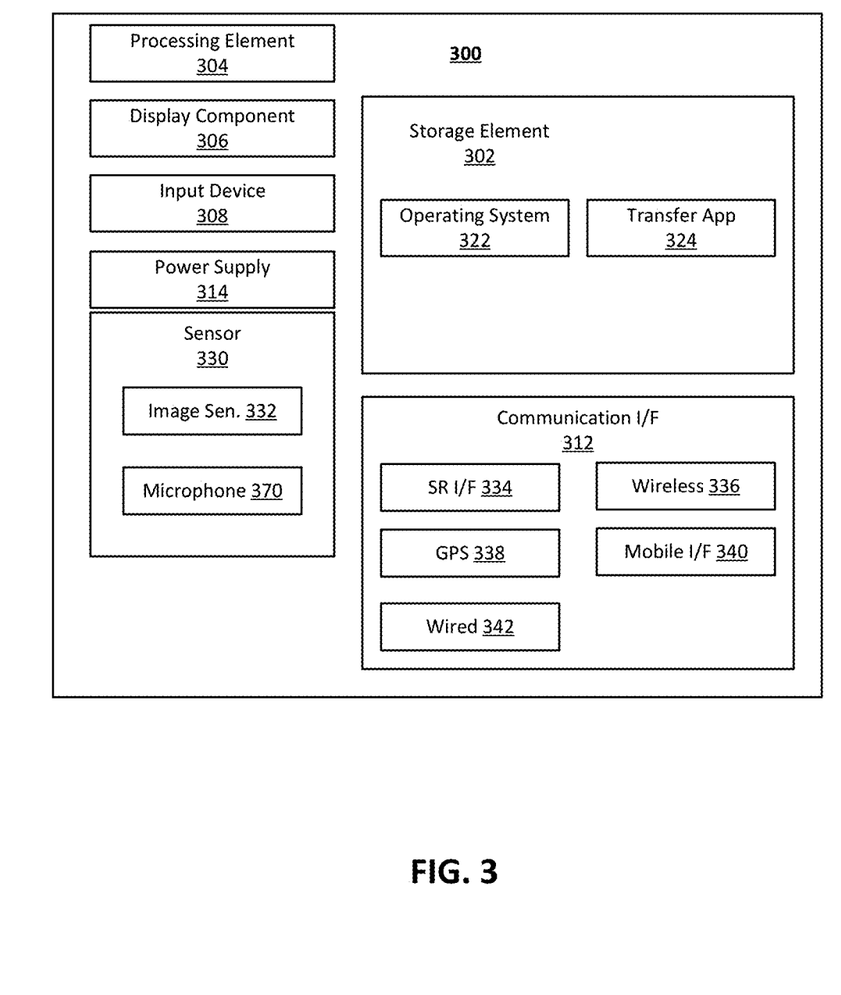
FIG. 3 is a block diagram showing an example architecture of a computing device that may be used in accordance with various embodiments described herein.

FIG. 3 is a block diagram showing an example architecture 300 of a computing device that may be used to implement recalibration frequency determination system 100, in accordance with various aspects of the present disclosure. It will be appreciated that not all devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc. Additionally, storage element 302 may store various weight sets and/or machine learning models of the recalibration frequency determination system 100.

The storage element 302 may also store software for execution by the processing element 304. An operating system 322 may provide the user with an interface for operating the computing device and may facilitate communications and commands between applications executing on the architecture 300 and various hardware thereof. A transfer application 324 may be configured to receive images, audio, and/or video from another device (e.g., a mobile device, image capture device, and/or display device) or from an image sensor 332 and/or microphone 370 included in the architecture 300.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 306 may be effective to display input images and/or segmentation masks generated in accordance with the various techniques described herein.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 or an array of microphones for capturing sounds, such as voice requests. In various examples, audio captured by microphone 370 may be streamed to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other computing devices. For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth®, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output. An example of an image sensor 332 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the recalibration frequency determination system 100, as described herein, are exemplary, and may be located as a stand-alone device or may be included, in whole or in part, as a component of a larger device or system.

Figure 4:
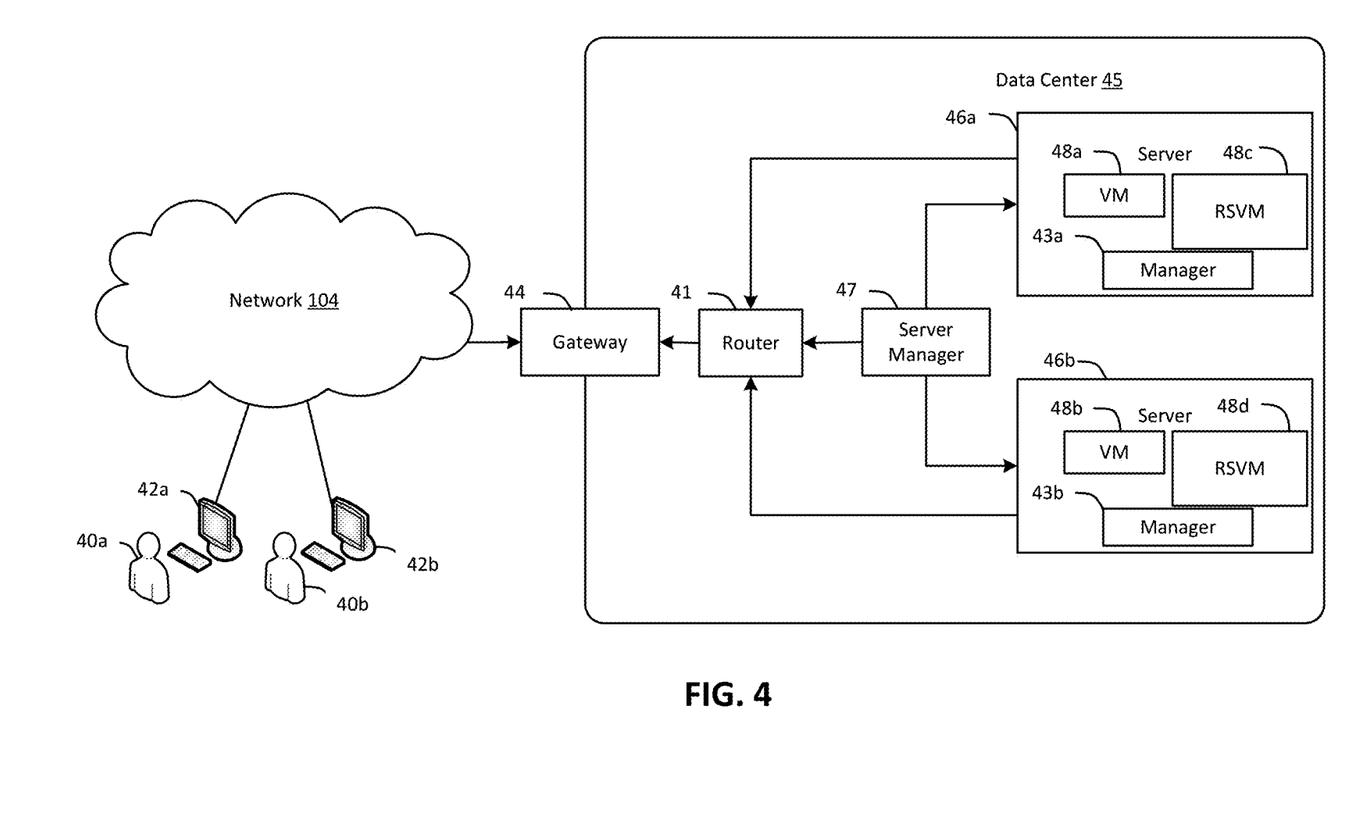
FIG. 4 is a diagram illustrating an example system for sending and providing data that may be used in accordance with the present disclosure.

An example system for sending and providing data and performing various computer processing techniques will now be described in detail. In particular, FIG. 4 illustrates an example computing environment in which the embodiments described herein may be implemented. For example, the computing environment of FIG. 4 may be used to estimate recalibration frequency of a machine learning model as a service over a network wherein one or more of the techniques described herein may be requested by a first computing device and may be performed by a different computing device configured in communication with the first computing device over a network. FIG. 4 is a diagram schematically illustrating an example of a data center 45 that can provide computing resources to users 40a and 40b (which may be referred herein singularly as user 40 or in the plural as users 40) via user computers 42a and 42b (which may be referred herein singularly as user computer 42 or in the plural as user computers 42) via network 104. Data center 45 may be configured to provide computing resources for executing applications on a permanent or an as-needed basis. The computing resources provided by data center 45 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the recalibration frequency determination system 100, as described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 45 may include servers 46a and 46b (which may be referred herein singularly as server 46 or in the plural as servers 46) that provide computing resources. These resources may be available as bare metal resources or as virtual machine instances 48a-d (which may be referred herein singularly as virtual machine instance 48 or in the plural as virtual machine instances 48). In at least some examples, server manager 47 may control operation of and/or maintain servers 46. Virtual machine instances 48c and 48d are rendition switching virtual machine ("RSVM") instances. The RSVM virtual machine instances 48c and 48d may be configured to perform all, or any portion, of the techniques for improved rendition switching and/or any other of the disclosed techniques in accordance with the present disclosure and described in detail above. As should be appreciated, while the particular example illustrated in FIG. 4 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 4, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 42. User computers 42 may be computers utilized by users 40 or other customers of data center 45. For instance, user computer 42a or 42b may be a server, a desktop or laptop personal computer, a tablet computer, a wireless telephone, a personal digital assistant (PDA), an e-book reader, a game console, a set-top box or any other computing device capable of accessing data center 45. User computer 42a or 42b may connect directly to the Internet (e.g., via a cable modem or a Digital Subscriber Line (DSL)). Although only two user computers 42a and 42b are depicted, it should be appreciated that there may be multiple user computers.

User computers 42 may also be utilized to configure aspects of the computing resources provided by data center 45. In this regard, data center 45 might provide a gateway or web interface through which aspects of its operation may be configured through the use of a web browser application program executing on user computer 42. Alternately, a stand-alone application program executing on user computer 42 might access an application programming interface (API) exposed by data center 45 for performing the configuration operations. Other mechanisms for configuring the operation of various web services available at data center 45 might also be utilized.

Servers 46 shown in FIG. 4 may be servers configured appropriately for providing the computing resources described above and may provide computing resources for executing one or more web services and/or applications. In one embodiment, the computing resources may be virtual machine instances 48. In the example of virtual machine instances, each of the servers 46 may be configured to execute an instance manager 43a or 43b (which may be referred herein singularly as instance manager 43 or in the plural as instance managers 43) capable of executing the virtual machine instances 48. The instance managers 43 may be a virtual machine monitor (VMM) or another type of program configured to enable the execution of virtual machine instances 48 on server 46, for example. As discussed above, each of the virtual machine instances 48 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 45 shown in FIG. 4, a router 41 may be utilized to interconnect the servers 46a and 46b. Router 41 may also be connected to gateway 44, which is connected to network 104. Router 41 may be connected to one or more load balancers, and alone or in combination may manage communications within networks in data center 45, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 45 shown in FIG. 4, a data center 45 is also employed to at least in part direct various communications to, from and/or between servers 46a and 46b. While FIG. 4 depicts router 41 positioned between gateway 44 and data center 45, this is merely an exemplary configuration. In some cases, for example, data center 45 may be positioned between gateway 44 and router 41. Data center 45 may, in some cases, examine portions of incoming communications from user computers 42 to determine one or more appropriate servers 46 to receive and/or process the incoming communications. Data center 45 may determine appropriate servers to receive and/or process the incoming communications based on factors such as an identity, location or other attributes associated with user computers 42, a nature of a task with which the communications are associated, a priority of a task with which the communications are associated, a duration of a task with which the communications are associated, a size and/or estimated resource usage of a task with which the communications are associated and many other factors. Data center 45 may, for example, collect or otherwise have access to state information and other information associated with various tasks in order to, for example, assist in managing communications and other operations associated with such tasks.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 45 described in FIG. 4 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 5:
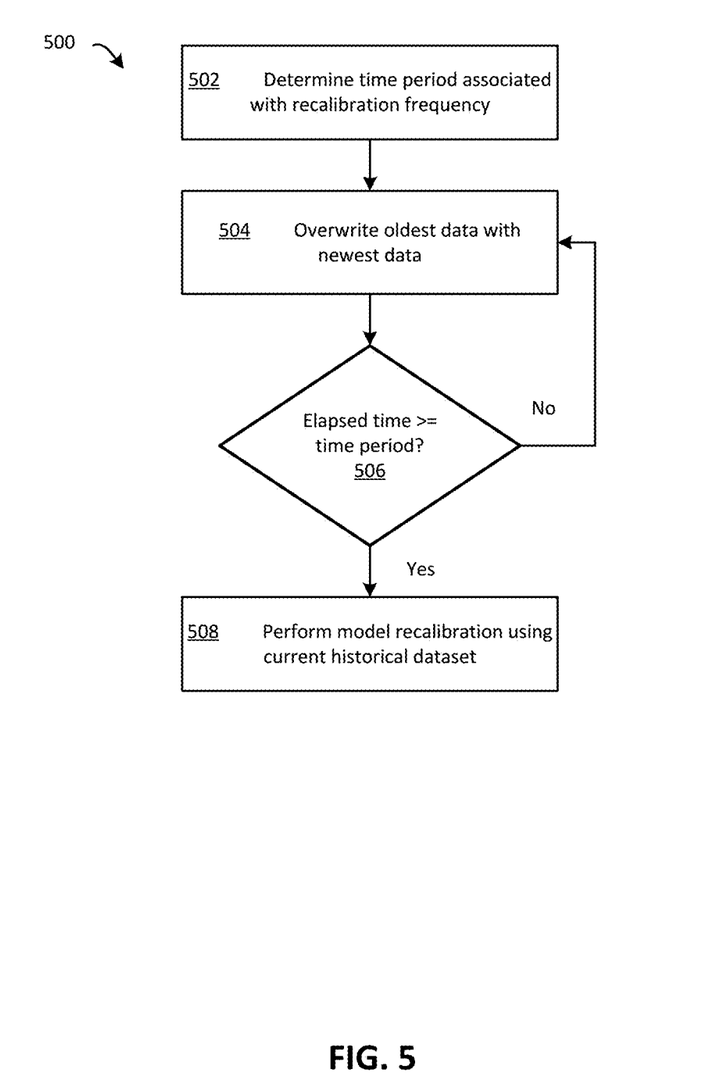
FIG. 5 is a flow diagram illustrating an example process for determining when to recalibrate a state space model, in accordance with various aspects of the present disclosure.

FIG. 5 is a flow diagram illustrating an example process 500 for determining when to recalibrate a state space model, in accordance with various aspects of the present disclosure.

The process 500 of FIG. 5 may be executed by computing device(s) 102 and/or by a combination of computing device(s) 102 and one or more other computing devices. The actions of process 500 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 500 may be described above with reference to elements of FIGS. 1-4.

Process 500 may begin at action 502, "Determine time period associated with recalibration frequency." In various examples, the techniques described above with respect to FIGS. 1-2 may be used to determine a recalibration frequency of a state space model (e.g., a model fitted to a time series of observational data). In various examples, the recalibration frequency may be determined based on a constraint of avoidance of hyperparameter drift, as described previously. In various examples, the recalibration frequency may be associated with a time period. For example, the recalibration frequency may indicate that the particular state space model is to be retrained and/or recalibrated every 3 weeks, 3.4 weeks, 3 days, 2 months, or some other period of time.

Processing may continue from action 502 to action 504, "Overwrite oldest data with newest data." At action 504, data may be continually collected for use in inference (model prediction) and to be used to recalibrate and/or retrain the model. However, in at least some examples, there may be a fixed window of data that is stored at a given time, even though data may be acquired continuously. For example, a single year's worth of data (data collected during a calendar year) may be stored at a given time. After collecting a year's worth of data points, the oldest data may be overwritten (e.g., by the newest, incoming data). In the current example, the year's worth of data may represent an amount of data that is just sufficient for retraining and/or recalibrating the model. It should be appreciated that although the oldest data may be overwritten with the newest data, the appropriate order and position of data points, with respect to one another may be maintained. For example, the 1 year worth of data may initially be daily data from Jan. 1, 2018 to Jan. 1, 2019. The data point representing Jan. 2, 2019 may overwrite the oldest data point (e.g., Jan. 1, 2018). However, the position and order of the Jan. 19, 2002 data point may indicate that this data point comes after Jan. 1, 2019 and before Jan. 3, 2019, in an ordered set.

At action 506, a determination may be made whether the current elapsed time is greater than or equal to the time period associated with the recalibration frequency. If so, processing may proceed to action 508, "Perform model recalibration using current historical dataset." At action 508, the model may be recalibrated by optimizing the model using the current dataset (e.g., the 1 year window of historical data, in the above example). If instead, the elapsed time is less than the time period associated with the recalibration frequency, processing may return to action 504, and additional data may be collected.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of determining a recalibration frequency of a state space model, the method comprising:

determining a first dataset of historical data stored in a storage element, comprising a plurality of observations;
determining a first hyperparameter value for a first instance of the state space model fitted to the first dataset of historical data by minimizing a loss function associated with the state space model;
determining a set of residual values, wherein each residual value of the set of residual values represents a difference between an observational data point of the first dataset of historical data and the state space model fitted to the first dataset;
generating a plurality of second datasets using the set of residual values;
determining a second hyperparameter value for each of the plurality of second datasets;
determining a variability of the second hyperparameter value among the plurality of second datasets, wherein the variability comprises a range from a mean hyperparameter value of the second datasets;
determining a first subset of the first dataset of historical data, wherein the first subset omits data associated with a first time period from the first dataset;
determining a third hyperparameter value for the first subset of the first dataset;
determining that the third hyperparameter value is outside the range from the mean hyperparameter value of the second datasets;
determining the first time period as the recalibration frequency of the state space model; and
providing computing resources by a data center or computing device to the state space model, based on the determined recalibration frequency, wherein the providing of the computing resources enables at least one of:
storing, in the storage element, newly collected observational data, the historical data, or a combination thereof, or
freezing at least one hyperparameter value of the state space model until a next recalibration event.

2. The method of claim 1, further comprising:
determining a fraction $\alpha$ of the first dataset of historical data to be omitted to generate the first subset of the first dataset;
determining that the fraction $\alpha$ comprises a first number of data points;
randomly selecting the first number of data points from a time series of data points of the first dataset of historical data; and
generating the first subset of the first dataset by omitting the selected first number of data points from the first dataset of historical data.

3. The method of claim 1, further comprising:
determining a first fraction $\alpha$ of the first dataset to be omitted to generate a second subset of the first dataset of historical data;
determining a fourth hyperparameter value for the second subset of the first dataset;
determining that the fourth hyperparameter value is within the range from the mean hyperparameter value of the second datasets; and
generating a second fraction $\alpha$ of the first dataset to be omitted to generate the first subset of the first dataset by increasing the first fraction $\alpha$ by a first amount, wherein a portion of the first dataset to be omitted is increased from the first fraction $\alpha$ to the second fraction $\alpha$ in response to the fourth hyperparameter value being within the range from the mean hyperparameter value of the second datasets.

4. The method of claim 1, further comprising generating a standardized set of residual values from the set of residual values by scaling an error variance of each residual value of the set of residual values, wherein the plurality of second datasets is generated using the standardized set of residual values.

5. A method of machine learning model calibration, comprising:
determining a first hyperparameter for a first dataset;
determining a residual value between a first data point of the first dataset and a value associated with a machine learning model fitted to the first dataset;
determining a variability of the first hyperparameter, wherein the variability comprises an acceptable range of hyperparameter values;
determining a second hyperparameter of a first subset of the first dataset;
determining a recalibration frequency for the machine learning model by comparing the second hyperparameter to the variability of the first hyperparameter; and
providing computing resources by a data center or computing device to the state space model, based on the determined recalibration frequency, wherein the providing of the computing resources enables at least one of:
storing, in the storage element, newly collected observational data, the historical data, or a combination thereof, or
freezing at least one hyperparameter value of the state space model until a next recalibration event.

6. The method of claim 5, further comprising:
generating a plurality of second datasets based at least in part on the residual value;
generating a plurality of second dataset hyperparameters by determining, for each dataset of the plurality of second datasets, a corresponding second dataset hyperparameter; and
determining a mean value of the plurality of second dataset hyperparameters, wherein the acceptable range of hyperparameter values comprises a range of values surrounding the mean value of the plurality of second dataset hyperparameters.

7. The method of claim 5, further comprising:
determining a first fraction of the first dataset to be omitted to generate the first subset of the first dataset;
determining that the first fraction comprises a first number of data points;
randomly selecting the first number of data points from a time series of data points of the first dataset; and
generating the first subset of the first dataset by omitting the selected first number of data points from the first dataset.

8. The method of claim 5, further comprising determining the first hyperparameter as a hyperparameter value that minimizes a loss function of the machine learning model for the first dataset, wherein the first dataset comprises time series data of a state space model.

9. The method of claim 5, further comprising:
determining a first fraction of the first dataset to be omitted to generate a second subset of the first dataset;
determining a third hyperparameter value for the second subset of the first dataset;
determining that the third hyperparameter value is within the acceptable range of hyperparameter values; and generating a second fraction of the first dataset to be omitted to generate the first subset of the first dataset by increasing the first fraction by a first amount, wherein a portion of the first dataset to be omitted is increased from the first fraction to the second fraction in response to the third hyperparameter value being within the acceptable range of hyperparameter values.

10. The method of claim 5, further comprising:
generating a set of residual values, wherein each residual value of the set of residual values represents a difference between an observational data point of the first dataset and a respective value of the machine learning model fitted to the first dataset; and
generating a standardized set of residual values from the set of residual values by scaling an error variance of each residual value of the set of residual values.

11. The method of claim 5, further comprising:
determining a plurality of hyperparameter values by minimizing a loss function of the machine learning model for the first subset of the first dataset; and
determining the second hyperparameter by averaging the plurality of hyperparameter values.

12. The method of claim 5, wherein the first dataset includes time series data obtained over a first time period, the method further comprising:
determining new data for the first dataset obtained over a second time period following the first time period; and
generating an updated first dataset by overwriting a portion of the time series data obtained over the first time period with the new data obtained over the second time period.

13. The method of claim 5, further comprising:
collecting first observational data over a first time period;
overwriting data of the first dataset with the first observational data to generate a second dataset;
determining that the first time period is less than a time period associated with the recalibration frequency;
collecting second observational data over a second time period;
overwriting data of the second dataset with the second observational data to generate a third dataset;
determining that the combination of the first time period and the second time period is greater than the time period associated with the recalibration frequency; and
determining a third hyperparameter for the machine learning model as a hyperparameter value that minimizes a loss function of the machine learning model for the third dataset.

14. The method of claim 5, further comprising:
causing a memory, database, or storage device to store observational data, if an elapsed time period is less than the time period associated with the recalibration frequency.

15. The method of claim 5, further comprising:
based on the recalibration frequency, discarding older historical data from a memory, database, or storage device.

16. The method of claim 5, further comprising:
causing a processor to recalibrate the hyperparameter value using a currently stored dataset, if an elapsed time equals or is greater than the recalibration frequency.

17. A computing system, comprising:
at least one processor; and
at least one memory storing instructions that, when executed by the at least one processor, are effective to program the at least one processor to:
determine a first hyperparameter for a first dataset;
determine a residual value between a first data point of the first dataset and a value associated with a machine learning model fitted to the first dataset;
determine a variability of the first hyperparameter, wherein the variability comprises an acceptable range of hyperparameter values;
determine a second hyperparameter of a first subset of the first dataset; and
determine a recalibration frequency for the machine learning model by comparing the second hyperparameter to the variability of the first hyperparameter; and provide computing resources by a data center or computing device to the state space model, based on the determined recalibration frequency, wherein the providing of the computing resources enables at least one of:
storing, in the storage element, newly collected observational data, the historical data, or a combination thereof, or
freezing at least one hyperparameter value of the state space model until a next recalibration event.

18. The computing system of claim 17, the at least one memory storing further instructions that, when executed by the at least one processor, are further effective to program the at least one processor to:
generate a plurality of second datasets based at least in part on the residual value;
generate a plurality of second dataset hyperparameters by determining, for each dataset of the plurality of second datasets, a corresponding second dataset hyperparameter; and
determine a mean value of the plurality of second dataset hyperparameters, wherein the acceptable range of hyperparameter values comprises a range of values surrounding the mean value of the plurality of second dataset hyperparameters.

19. The computing system of claim 17, the at least one memory storing further instructions that, when executed by the at least one processor, are further effective to program the at least one processor to:
determine a first fraction of the first dataset to be omitted to generate the first subset of the first dataset;
determine that the first fraction comprises a first number of data points;
randomly select the first number of data points from a time series of data points of the first dataset; and
generate the first subset of the first dataset by omitting the selected first number of data points from the first dataset.

20. The computing system of claim 17, the at least one memory storing further instructions that, when executed by the at least one processor, are further effective to program the at least one processor to:
determine the first hyperparameter as a hyperparameter value that minimizes a loss function of the machine learning model for the first dataset, wherein the first dataset comprises time series data of a state space model.

21. The computing system of claim 17, the at least one memory storing further instructions that, when executed by the at least one processor, are further effective to program the at least one processor to:
determine a first fraction of the first dataset to be omitted to generate a second subset of the first dataset;
determine a third hyperparameter value for the second subset of the first dataset;

determine that the third hyperparameter value is within the acceptable range of hyperparameter values; and generate a second fraction of the first dataset to be omitted to generate the first subset of the first dataset by increasing the first fraction by a first amount, wherein a portion of the first dataset to be omitted is increased from the first fraction to the second fraction in response to the third hyperparameter value being within the acceptable range of hyperparameter values.

22. The computing system of claim 17, the at least one memory storing further instructions that, when executed by the at least one processor, are further effective to program the at least one processor to:

generate a set of residual values, wherein each residual value of the set of residual values represents a difference between an observational data point of the first dataset and a respective value of the machine learning model fitted to the first dataset; and generate a standardized set of residual values from the set of residual values by scaling an error variance of each residual value of the set of residual values.

23. The computing system of claim 17, the at least one memory storing further instructions that, when executed by the at least one processor, are further effective to program the at least one processor to:

determine a plurality of hyperparameter values by minimizing a loss function of the machine learning model for the first subset of the first dataset; and determine the second hyperparameter by averaging the plurality of hyperparameter values.

\* \* \* \* \*